United States Patent [19]

Hetzel

[11] Patent Number: 5,737,370

[45] Date of Patent: Apr. 7, 1998

[54] METHOD FOR INITIALIZING A NETWORK

[75] Inventor: Herbert Hetzel, Weingarten, Germany

[73] Assignee: Becker GmbH, Karlsbad-Ittersbach, Germany

[21] Appl. No.: 595,839

[22] Filed: Feb. 2, 1996

[30] Foreign Application Priority Data

Feb. 2, 1995 [DE] Germany .................. 195 03 214.4

[51] Int. Cl.⁶ ........................................ H04L 7/00

[52] U.S. Cl. .................. 375/356; 375/373; 370/222; 370/324; 370/503; 370/544

[58] Field of Search .......................... 375/354, 356, 375/357, 371, 373; 370/217, 220, 221–224, 324, 503, 516, 492, 909, 544; 359/158, 164, 166

[56] References Cited

U.S. PATENT DOCUMENTS

| | | | |
|---|---|---|---|
| 4,779,261 | 10/1988 | Yamagishi et al. | 370/222 |
| 5,327,468 | 7/1994 | Edblad et al. | 375/356 |

*Primary Examiner*—Stephen Chin
*Assistant Examiner*—Amanda T. Le
*Attorney, Agent, or Firm*—Herbert L. Lerner; Laurence A. Greenberg

[57] ABSTRACT

A method for initializing a network for data transmission between a plurality of subscribers being connected to one another in ring-like fashion, includes sending a clock signal through the network in a continuous data stream, originating at a network position. In each subscriber, a process of locking onto the clock frequency is started after reception of the data stream, and the data stream is forwarded to the next subscribers in succession after locking on is completed. In order to speed up the initializing process, the arriving data stream is split into two identical streams at each subscriber, as long as it has not yet locked on. One of the streams is used for the locking-on process and the other of the streams is immediately forwarded to the next subscriber.

8 Claims, 1 Drawing Sheet

METHOD FOR INITIALIZING A NETWORK

BACKGROUND OF THE INVENTION

Field of the Invention

The present invention relates to a method for initializing a network for data transmission between a plurality of subscribers being connected to one another in ring-like fashion, in which a clock signal is sent through the network in a continuous data stream originating at a network position, a process of locking onto the clock frequency is started in each subscriber after reception of the data stream, and the data stream is forwarded to the next subscriber in succession after locking on is completed.

In networks for data transmission between a plurality of subscribers being connected to one another in a ring, the data are transmitted between the subscribers at a certain clock rate. That requires a clock signal, which is fed into the network at one point, in particular through the use of a subscriber functioning as a master. In a known method of that type, the master sends the clock signal that it has generated to the next subscriber, where a process of locking onto the transmitted clock frequency is started. Once locking on to the clock frequency has been completed, that subscriber forwards the data received from the master to the next subscriber, in which a locking-on process is likewise started, and so forth.

A disadvantage of that known method is that putting the network into operation takes considerable time, since initially all of the subscribers have to be locked on to the clock frequency being output by the master, before data transmission in the entire network is possible. The time required for putting the network into operation therefore increases with an increasing number of subscribers, which given a typical locking-on time of approximately 20 to 30 ms rapidly leads to a considerable delay.

SUMMARY OF THE INVENTION

It is accordingly an object of the invention to provide a method for initializing a network, which overcomes the hereinafore-mentioned disadvantages of the heretofore-known methods of this general type and which speeds up the process of putting the network into operation.

With the foregoing and other objects in view there is provided, in accordance with the invention, a method for initializing a network for data transmission between a plurality of subscribers connected to one another like a ring, which includes sending a clock signal through the network in a continuous data stream originating at a network position, starting a process of locking onto a clock frequency in each subscriber after reception of the data stream, and forwarding the data stream to the next subscriber in succession after locking on is completed, which comprises splitting the not-yet-locked-on arriving data stream at each subscriber into two identical streams, using one of the streams for the locking-on process, and immediately forwarding the other of the streams to the next subscriber.

By splitting up the data stream in each subscriber into two identical data streams and immediately forwarding them to the next subscriber, all of the subscribers in the network receive the clock signal practically simultaneously and begin the locking-on process practically simultaneously. Accordingly, the locking on of all of the subscribers is completed virtually within the same amount of time as is needed for a single subscriber to lock on. In other words, the time required for all of the subscribers to lock onto the specified clock frequency is reduced over the known method by a factor that is equivalent to the number of subscribers in the network.

In accordance with another mode of the invention, in order to immediately forward the data stream through the subscribers upon simultaneous starting of the locking-on process, the data stream received in a subscriber is supplied to a control unit in which a first and a second data stream are generated by copying, the first data stream is routed to a locking-on circuit, and the second data stream is routed directly to the next subscriber. In this way, the data stream containing the clock signal is available to all of the subscribers virtually simultaneously, and each subscriber begins the locking-on process parallel to the forwarding of the data stream. Once the locking-on process has been completed, the control unit routes the first data stream that is routed to the locking-on circuit, to the next subscriber, and interrupts the second, direct data stream. This concludes the initialization, and the network can be used to transmit data between individual transmitters.

In accordance with a further mode of the invention, the control unit, upon a malfunction of a subscriber, routes the received data stream directly to the next subscriber. The malfunction of a subscriber, for example by coming unlocked from the clock frequency, results in the data stream transmitted in the network being interrupted at the location of that subscriber. In a unidirectional ring network, the data transmission is then interrupted. As a result of this feature of the invention, it is now assured that in the event of a malfunction of one subscriber, this subscriber is virtually removed from the network. In other words, the data stream is simply routed through it. Thus data transmission continues to be possible between all of the other subscribers of the network.

The immediate forwarding of the received data stream to the next subscriber is preferably carried out in turn in such a way that the control unit copies the received data stream and sends it on one hand directly to the next subscriber and on the other hand to the locking-on circuit. If the affected subscriber at some later time should be functioning properly once again, for instance after a reset operation, then a new locking-on operation is started in it, and once locking has been completed the direct forwarding of the data stream is replaced with the proper routing of the data stream through this subscriber. The temporarily defective subscriber can thus be re-integrated into the network in a simple way.

In accordance with an added mode of the invention, in order to make a malfunction apparent, the control unit of a defective subscriber preferably generates an error report signal.

In accordance with a concomitant mode of the invention, the error report signal can also be provided with the address of the subscriber and transmitted over the network to a certain receiver, which by way of example has a display unit for defective subscribers.

Other features which are considered as characteristic for the invention are set forth in the appended claims.

Although the invention is illustrated and described herein as embodied in a method for initializing a network, it is nevertheless not intended to be limited to the details shown, since various modifications and structural changes may be made therein without departing from the spirit of the invention and within the scope and range of equivalents of the claims.

The construction and method of operation of the invention, however, together with additional objects and

DESCRIPTION OF THE PREFERRED EMBODIMENTS

Figure 1:
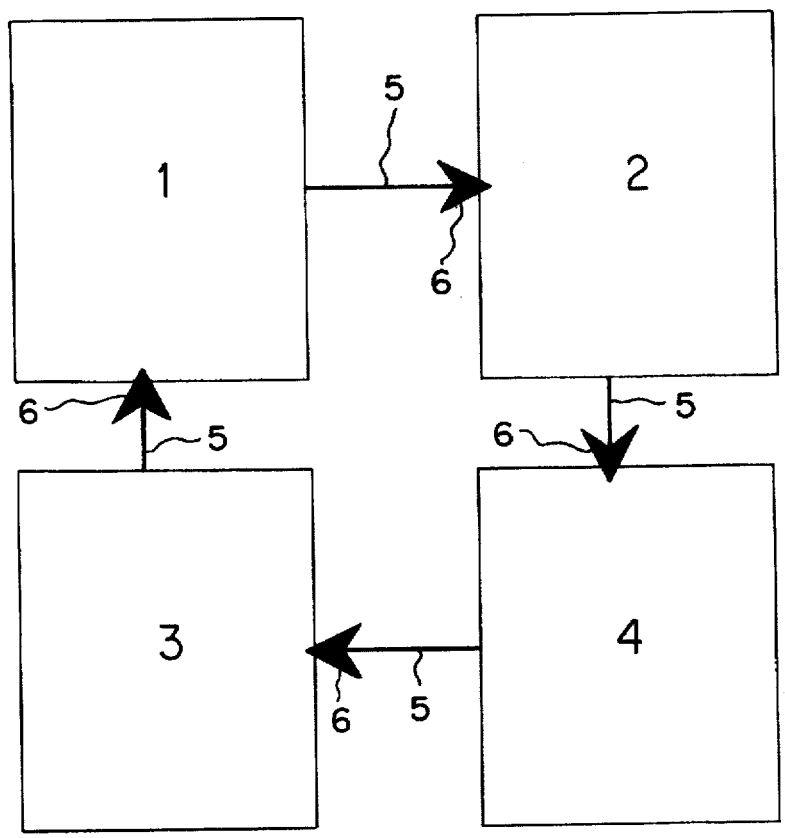
FIG. 1 is a block circuit diagram of a network with a ring structure having a plurality of subscribers.

Referring now to the figures of the drawing in detail and first, particularly, to FIG. 1 thereof, there is seen a network which includes four subscribers 1–4 connected in a ring. These four subscribers include, for instance, a radio receiver 1 and a CD player 2 as data sources, as well as an amplifier 3 and an audio-video control unit 4 as data sinks. However, all of the data sources can simultaneously also act as data sinks, and all of the data sinks can simultaneously act as data sources, especially for control data.

The four subscribers 1–4 are connected to one another over a data line 5, which by way of example is an optical fiber. The data transmission between individual subscribers takes place in a direction indicated by arrows 6.

Figure 2:
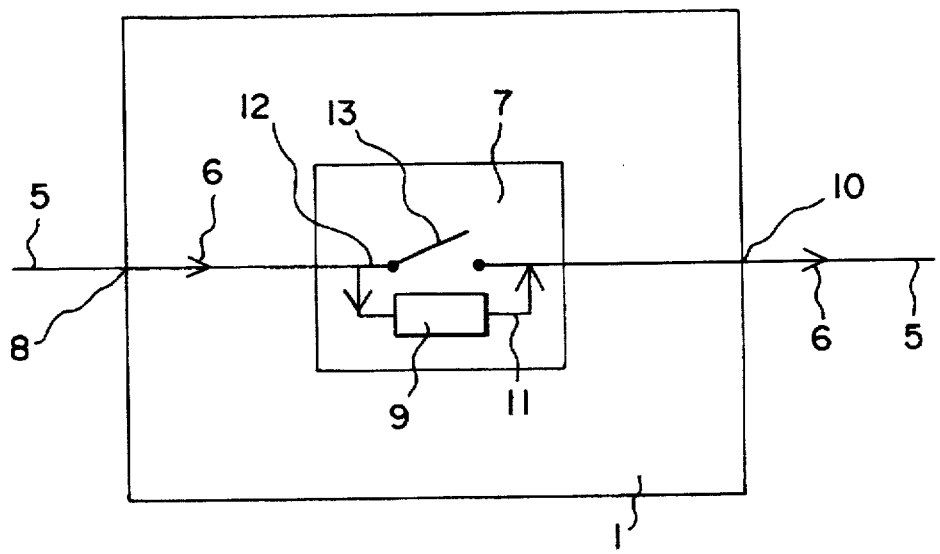
FIG. 2 is a schematic circuit diagram illustrating forwarding data through a subscriber.

Each of the subscribers 1–4 includes a control unit 7, which is shown by way of example in FIG. 2 for the subscriber 1. The data transmission through the various subscribers is controlled by the control unit 7. The data received through a network data input 8 are carried to the control unit 7. The control unit 7 is constructed, in particular, as an integrated circuit, which includes a locking-on circuit 9 and which is connected to a network data output 10.

The data stream received through the network input 8 is copied by the control unit and split into a first and a second data stream. The first data stream is supplied over an internal data line 11 to the locking-on circuit 9 in which a locking-on process is started. The second data stream is connected through an internal bypass 12 directly to the network output 10. As soon as the locking-on circuit 9 has completed the locking-on process, the internal bypass 12 is interrupted by the control unit 7, as is indicated by a switch 13 that is present in the line 12.

When the network is put into operation, the switch 13 is closed, and the data stream received through the network input 8 is carried on one hand to the locking-on circuit 9 and on the other hand through the network output 10 to the next subscriber. The next suitably constructed subscriber likewise copies the data stream and carries it on one hand, to its locking-on circuit and on the other hand, through its network output, directly to the subscriber that follows it, and so forth. In this way, upon startup of operation, all of the subscribers practically simultaneously receive the clock signal and start the operation of locking onto this signal in parallel. As soon as the locking operation is concluded, each subscriber interrupts its bypass 12 and carries the data stream, through its locking-on circuit 9 and its network output 10, to the next subscriber.

Through the use of the initializing method described above, all of the subscribers in a network are locked on virtually simultaneously to the specified clock signal. In other words, a parallel process of locking on of all of the subscribers of a network takes place, and takes substantially no longer than the locking on of a single subscriber.

I claim:

1. In a method for initializing a network for data transmission between a plurality of subscribers connected to one another like a ring, which includes sending a clock signal through the network in a continuous data stream originating at a network position, starting a process of locking onto a clock frequency in each subscriber after reception of the data stream, and forwarding the data stream to the next subscriber in succession after locking on is completed, the improvement which comprises:

splitting a not-yet-locked-on arriving data stream at each subscriber into two identical streams, using one of the streams for the locking-on process, and immediately forwarding the other of the streams to the next subscriber.

2. The method according to claim 1, which comprises:

performing the splitting step by supplying the data stream received in a subscriber to a control unit in which the one of the data streams and the other of the data streams are generated by copying;

routing the one of the data streams to a locking-on circuit and routing the other of the data streams directly to the next subscriber; and routing the one of the data streams being routed to the locking-on circuit to the next subscriber and interrupting the other of the data streams with the control unit once the locking-on process has been completed.

3. The method according to claim 2, which comprises routing the data stream received by a given subscriber directly to the next subscriber, with the control unit, upon a malfunction of the given subscriber.

4. The method according to claim 3, which comprises generating a first and a second data stream by copying the data stream, routing the first data stream to the locking-on circuit and routing the second data stream directly to the next subscriber with the control unit upon a malfunction of a subscriber, and routing the first data stream which had been routed to the locking-on circuit to the next subscriber and again interrupting the second data stream when function is resumed and the subscriber has relocked on.

5. The method according to claim 4, which comprises outputting an error report signal from the control unit upon a malfunction.

6. The method according to claim 5, which comprises providing the error report signal with an address of the defective subscriber and transmitting the error report signal over the network to a location that processes the error report signal.

7. The method according to claim 3, which comprises outputting an error report signal from the control unit upon a malfunction.

8. The method according to claim 7, which comprises providing the error report signal with an address of the defective subscriber and transmitting the error report signal over the network to a location that processes the error report signal.

* * * * *